US006841078B2

United States Patent
McCamy

(10) Patent No.: US 6,841,078 B2
(45) Date of Patent: Jan. 11, 2005

(54) PH REDUCTION SYSTEM AND METHOD FOR CONCRETE PLANT DISCHARGE

(75) Inventor: Carter Benson McCamy, Adamstown, MD (US)

(73) Assignee: Environmental Quality Resources, L.L.C., Gaithersburg, MD (US)

( * ) Notice: Subject to any disclaimer, the term of this patent is extended or adjusted under 35 U.S.C. 154(b) by 366 days.

(21) Appl. No.: 10/033,889

(22) Filed: Jan. 3, 2002

(65) Prior Publication Data

US 2003/0121866 A1 Jul. 3, 2003

(51) Int. Cl.$^7$ ................................................ C02F 1/00
(52) U.S. Cl. ........................ 210/743; 210/749; 210/143; 210/198.1; 210/205
(58) Field of Search ................................ 210/743, 749, 210/143, 192, 198.1, 205

(56) References Cited

U.S. PATENT DOCUMENTS

| | | | |
|---|---|---|---|
| 4,200,526 A | | 4/1980 | Johnson et al. |
| 4,217,217 A | | 8/1980 | Kay et al. |
| 4,340,489 A | * | 7/1982 | Adams et al. ............... 210/718 |
| 5,167,829 A | | 12/1992 | Diamond et al. |
| 5,360,551 A | | 11/1994 | Weber |
| 5,697,257 A | * | 12/1997 | Oh ............................ 74/490.06 |
| 5,707,658 A | | 1/1998 | Morgan et al. |
| 5,733,463 A | | 3/1998 | Sargent et al. |
| 5,833,863 A | * | 11/1998 | Richards et al. ............. 210/712 |
| 5,885,463 A | * | 3/1999 | Carriero ..................... 210/662 |
| 5,885,478 A | | 3/1999 | Montgomery et al. |
| 6,066,262 A | | 5/2000 | Montgomery et al. |
| 6,270,677 B1 | | 8/2001 | Gopal et al. |
| 6,582,610 B2 | * | 6/2003 | Williams et al. ............. 210/712 |

* cited by examiner

Primary Examiner—Betsey Morrison Hoey
(74) Attorney, Agent, or Firm—Nixon & Vanderhye P.C.

(57) ABSTRACT

A water treatment system and method reduces the pH level of a waste stream from an unacceptably high level with maximum efficiency and safety, and minimum costs and labor. The system includes a pH control system that detects a pH level of the waste stream. An acid discharge unit including a source of acid and an acid feeding mechanism is activated and deactivated by the pH control system according to the pH level of the waste stream. A housing contains the acid discharge unit and at least part of the pH control system. The acid feeding mechanism may feed dry acid directly to the waste stream or premix the dry acid with water to form a wet acidic solution that is fed into the waste stream. A mixing tank may be provided downstream of the housing to serve as an area for mixing acidic materials from the acid discharge unit with the waste stream prior to discharge from the plant.

22 Claims, 2 Drawing Sheets

PH REDUCTION SYSTEM AND METHOD FOR CONCRETE PLANT DISCHARGE

CROSS-REFERENCES TO RELATED APPLICATIONS (NOT APPLICABLE)

STATEMENT REGARDING FEDERALLY SPONSORED RESEARCH OR DEVELOPMENT (NOT APPLICABLE)

BACKGROUND OF THE INVENTION

The present invention relates to a pH control system for the alkaline waters from the ready-mix concrete batching process.

Stormwater permitting has been required of concrete plants since 1992, under revisions to the Clean Water Act. Additional requirements have been implemented by local and state governments under their respective NPDES (National Pollutants Discharge Permit) permits. Under these requirements, industrial activities that have stormwater discharges, with pollutants associated with the industrial activities, must meet certain minimum levels of treatment for pollutants specifically identified in their permit. As set by the U.S. Environmental Protection Agency (EPA), the concrete industry is required to minimize or eliminate to the maximum extent possible sand and fine materials, cementatious materials, pH levels higher than 9.0, admixtures, oils and greases.

Typical systems for treating plant waste water are bulky and expensive to manufacture and operate. These systems typically utilize a much stronger acid (sulfuric acid), which can cause permanent damage to the equipment operator if it comes into contact with the skin or eyes. Additionally, spills require specialized clean up procedures requiring assistance from an experienced hazardous waste contractor or public response crew.

SUMMARY OF THE INVENTION

After preliminary filtering of sediments, this invention provides a system and method for reducing the pH in solution of discharge water in a manner that is safer than commonly used applications. The acid used to reduce the pH is preferably sodium bisulfate or other dry granular equivalent that readily dissolves in water to form a weak acidic solution. The granular product can be swept up from surfaces if spilled. Moreover, the material will not burn, is a only a moderate irritant to the skin, an irritant if inhaled, and is considered a mild to severe irritant if contact is made with the eyes. (A sodium bisulfate product that is suitable for the system and method according to the present invention is available from Jones-Hamilton Co. of Newark, Calif.—this manufacturer provides that flushing the eyes with water will treat the contacted area in most cases.) Sodium bisulfate is typically sold as a pool chemical to reduce pH. It is an off-the-shelf product considered safer than sulfuric acid, which is a commonly used industrial buffering agent.

This invention proposes the necessary equipment and material to (1) measure the pH level within the discharge waste stream; (2) automatically turn on a mechanical system that will introduce the acid into solution; and (3) automatically turn off the mechanical system, thus stopping the introduction of the acid treatment when acceptable pH levels are met in the waste stream.

According to EPA regulations, waste or storm water that has a pH in excess of 9.0 must be treated, and the present invention effects such treatment through admixing of an acid into the water. The treatment will lower the pH of the waste or storm water discharge to a level considered acceptable under federal and state regulations.

In an exemplary embodiment of the invention, a water treatment system is provided for treating a waste stream from a concrete plant or the like. The water treatment system includes a pH control system that detects a pH level of the waste stream. An acid discharge unit communicating with the pH control system includes a source of acid and an acid feeding mechanism. The pH control system activates and deactivates the acid discharge unit according to the pH level of the waste stream. A housing contains the acid discharge unit and at least part of the pH control system. The pH control system preferably includes a pH probe disposed in the waste stream, outside of the housing. The source of acid may be an acid storage unit storing a supply of dry acid, such as sodium bisulfate.

The acid feeding mechanism may be at least partially disposed within the acid storage unit, wherein the acid feeding mechanism feeds the dry acid into the waste stream when the pH level of the waste stream exceeds a predetermined level. In an alternative arrangement, the acid feeding mechanism includes a mechanical pump coupled with a source of water and a mixing container for mixing the dry acid with the water to form a wet acidic solution, wherein the acid feeding mechanism feeds the wet acidic solution into the waste stream when the pH level of the waste stream exceeds a predetermined level. In this embodiment, the source of water is preferably the waste stream. Additionally, the mixing container may include an overflow outlet that pipes the wet acidic solution directly into the waste stream.

The system may additionally include a mixing tank downstream of the housing, which provides an area for acidic materials from the acid discharge unit to mix with the waste stream to become an aqueous solution with an acceptable pH level for discharge from the water treatment system. Preferably, the mixing tank is sized to store a liquid volume equal to about ten minutes of waste stream flow. The pH probe may be disposed in the waste stream downstream from the mixing tank.

In another exemplary embodiment of the invention, a method of treating a waste stream includes the steps of (a) detecting a pH level of the waste stream, (b) storing a dry acid in an acid source and coupling the acid source with an acid discharge unit, (c) activating and deactivating the acid discharge unit according to the pH level of the waste stream, and (d) containing the acid discharge unit and at least part of the pH control system within a housing.

In still another exemplary embodiment of the invention, a pH level reduction system for a waste stream includes a pH control system including a pH probe disposed in the waste stream that detects a pH level of the waste stream. An acid discharge unit communicates with the pH control system and includes a source of dry granular acid and one of a wet acid feeding mechanism and a dry acid feeding mechanism. The pH control system further includes a controller communicating with the pH probe that activates and deactivates the acid discharge unit according to the pH level of the waste stream in a feedback control loop. The acid discharge unit and the controller of the pH control system are also housed within a weatherproof housing.

BRIEF DESCRIPTION OF THE DRAWINGS

These and other aspects and advantages of the present invention will be described in detail with reference to the accompanying drawings, in which.

DETAILED DESCRIPTION OF PREFERRED EMBODIMENTS

Figure 1:
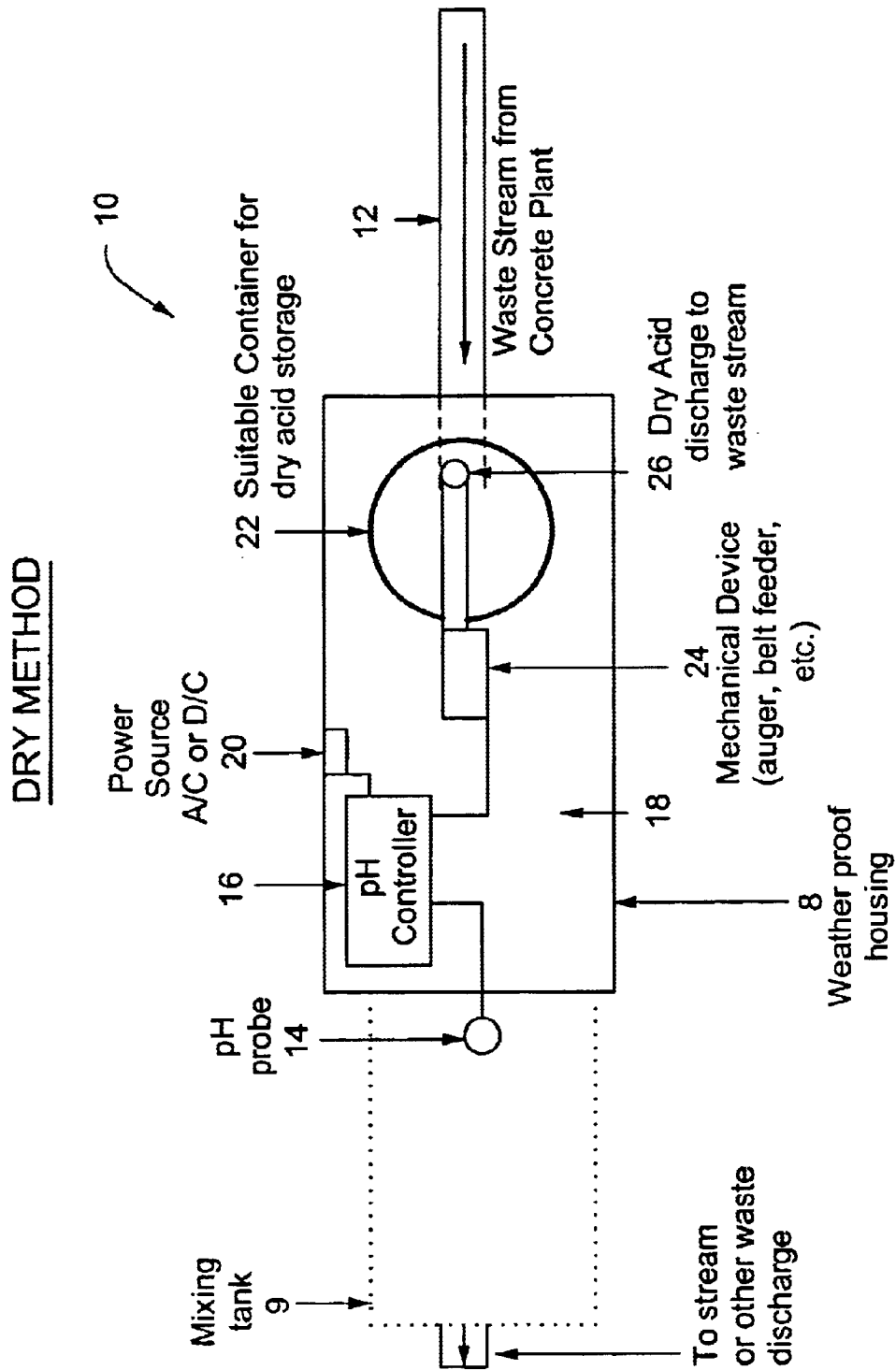
FIG. 1 is a schematic illustration of the water treatment system according to the present invention using a dry treatment method.

This invention is particularly suited for the treatment of stormwater or waste water discharge from concrete batch plants, where the aqueous solution to be treated has a pH level in excess of 9.0. The system 10 of the invention is designed to reduce this high pH to a level that is closer to neutral (7.0), within a range of about 5.0–9.0.

Referring to the drawings, the waste or storm water stream to be treated is confined to a pipe or tank 12. The pH level of the waste water is detected by way of an electronic probe 14 located within the water. Such pH probes are known and readily available, and the structural details and operation thereof will thus not be further described. The probe 14 should be placed downstream of the acid application to provide sufficient flow time for the acid to effectively reduce the pH level of the waste stream. If the probe 14 is placed too far downstream, however, unnecessary additional acid may be deposited into the waste stream before a more neutral pH level is detected, resulting in wasted acid. Notwithstanding, the system may be programmed to accommodate remote probe placement.

A pH controller 16, including, for example, a processor, interface, memory, etc., receives a signal from the pH probe 14 to determine the current pH level of the waste stream, which may be displayed on a liquid crystal monitor or the like (not shown). The pH controller 16 is preset by the operator to turn on an acid discharge unit 18 so as to introduce an acid such as sodium bisulfate into the waste stream. The pH controller 16 is preset by the operator to turn off the acid discharge unit 18 when acceptable pH levels are reached. A power source 20 for the pH controller may comprise batteries, solar panels, 110V A/C electricity, etc. The same power source 20 may be used for the acid discharge unit 18, or the acid discharge unit 18 may have its own power source (not shown).

With reference to FIG. 1, in one embodiment, the acid discharge unit 18 includes a source of acid such as a suitable container 22 or the like storing the acid and an acid feeding mechanism 24, which is at least partially disposed within the container 22. A suitable container is defined as one in which the acid will not corrode the container. In this embodiment, the container 22 is preferably covered and provides a free flow of material to the feeding mechanism 24. The acid feeding mechanism 24 may be any suitable dry feeder, including, for example, a powered auger feeder, a powered screw feeder, a powered belt feeder or some other means that will move the dry acid from the container 22 to the waste stream to be treated. A discharge conduit 26 of the acid discharge unit 18 is disposed adjacent or in contact with the waste stream, and the acid feeding mechanism 24 feeds the dry acid into the waste stream via the discharge conduit 26. The dry acid preferably readily dissolves in the water such that no further processing of the acid is required.

Figure 2:
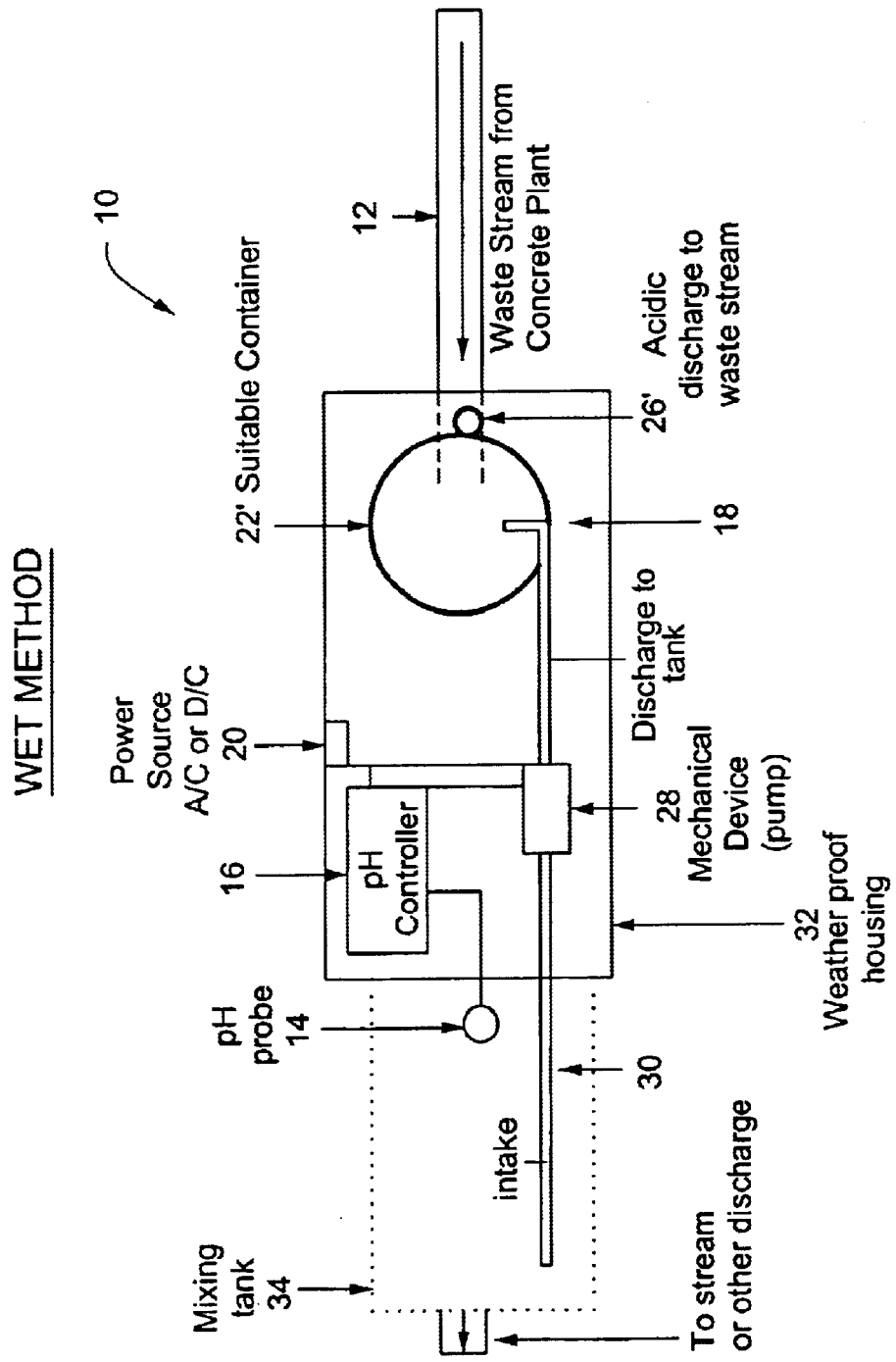
FIG. 2 is a schematic illustration of the water treatment system according to the present invention using a wet treatment method.

With reference to FIG. 2, in an alternative embodiment, the acid discharge unit 18 includes a container 22' suitable for a wet acidic solution and a mechanical pump 28 coupled with a source of water, preferably the waste stream, via an intake conduit 30. The container 22' serves as a mixing container for mixing dry acid stored in the container 22' with the water pumped via the mechanical pump 28 to form a wet acidic solution. A suitable container for the wet application is defined as one in which the acid will not corrode the container. The container 22' is preferably covered and provides an area for water pumped via the mechanical pump 28 to mix with acid stored in the container 22'. Preferably, the intake conduit 30 siphons water from as far downstream from the treatment system as possible, but the system will function properly even using waste water directly from the plant. The mixing container 22' includes an overflow outlet 26' that pipes the wet acidic solution directly into the waste stream.

As noted, a particularly suitable acid for the system and method according to the present invention is sodium bisulfate. In its dry form, sodium bisulfate is easy to work with and can be readily swept up if spilled. The acid quickly dissolves in water to form a weak acidic solution. In either the dry or wet embodiment described above, the acid is introduced directly into the waste stream to neutralize the plant discharge water. This mixed discharge water is constantly measured by the pH probe 14 of the pH controller 16 in an endless feedback loop, and when acceptable pH levels are reached, the controller 16 shuts off the acid discharge unit 18.

The system components including the acid discharge unit 18 and at least the control and power components of the pH control system 16 are preferably contained within a single weatherproof housing 32. Protection can be in the form of any water resistant structure. Additionally, the system preferably also includes a mixing tank 34 downstream of the housing 32 in line with the waste stream. The mixing tank 34 provides an area for the acidic materials and the waste stream to mix and become an aqueous solution with an acceptable pH level for discharge from the plant. The mixing tank 34 is preferably of a material that will not deteriorate when exposed to a wide range of pH and is preferably of sufficient size to allow for proper mixing of the acid and the water to be treated. Sufficient size may be defined as a tank capable of storing a liquid volume equal to ten (10) minutes of flow within the stream to be treated. For example, if the stream to be treated flows at a rate of five (5) gallons per minute, the tank should hold a minimum of fifty (50) gallons of liquid.

Operation of the system includes monthly calibration of the pH control system 16 and daily inspection of the storage container 22, 22' to ensure adequate supply of acid as may be needed for treatment of the waste stream. With respect to the monthly calibration, the pH probe is a sensitive device which typically requires direct contact with the solution to be tested. Periodic cleansing of the probe maintains this contact. Calibration of the meter is then done by inserting the probe into a solution of known pH. The pH meter is then adjusted to exactly match the reading from the probe and the known pH of the calibration solution.

The system according to the present invention effects treatment of waste water with maximum efficiency and safety, and minimum costs and labor. The process reduces the pH level of the waste stream from an unacceptably high level, which may vary, to an acceptable level for discharge, in a range of about 5.0 to 9.0.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A water treatment system for treating a waste stream, the water treatment system comprising:
   a pH control system that detects a pH level of the waste stream;
   an acid discharge unit communicating with the pH control system, the acid discharge unit including a source of acid and an acid feeding mechanism, wherein the pH control system activates and deactivates the acid discharge unit according to the pH level of the waste stream; and
   a housing containing the acid discharge unit and at least part of the pH control system,
   wherein the pH control system includes a pH probe disposed in the waste stream, outside of the housing.

2. A water treatment system for treating a waste stream, the water treatment system comprising:
   a pH control system that detects a pH level of the waste stream;
   an acid discharge unit communicating with the pH control system, the acid discharge unit including a source of acid and an acid feeding mechanism, wherein the source of acid comprises an acid storage unit storing a supply of dry acid, and wherein the pH control system activates and deactivates the acid discharge unit according to the pH level of the waste stream; and
   a housing containing the acid discharge unit and at least part of the pH control system.

3. A water treatment system according to claim 2, wherein the acid feeding mechanism is at least partially disposed within the acid storage unit, the acid feeding mechanism feeding the dry acid into the waste stream when the pH level of the waste stream exceeds a predetermined level.

4. A water treatment system according to claim 2, wherein the acid feeding mechanism comprises a mechanical pump coupled with a source of water and a mixing container for mixing the dry acid with the water to form a wet acidic solution, the acid feeding mechanism feeding the wet acidic solution into the waste stream when the pH level of the waste stream exceeds a predetermined level.

5. A water treatment system according to claim 4, wherein the source of water is the waste stream.

6. A water treatment system according to claim 4, wherein the mixing container comprises an overflow outlet that pipes the wet acidic solution directly into the waste stream.

7. A water treatment system according to claim 2, wherein the dry acid comprises a granular material that dissolves in water to form a weak acid solution.

8. A water treatment system according to claim 7, wherein the dry acid comprises sodium bisulfate.

9. A water treatment system for treating a waste stream, the water treatment system comprising:
   a pH control system that detects a pH level of the waste stream;
   an acid discharge unit communicating with the pH control system, the acid discharge unit including a source of acid and an acid feeding mechanism, wherein the pH control system activates and deactivates the acid discharge unit according to the pH level of the waste stream;
   a housing containing the acid discharge unit and at least part of the pH control system; and
   a mixing tank downstream of the housing, the mixing tank providing an area for acidic materials from the acid discharge unit to mix with the waste stream to become an aqueous solution with an acceptable pH level for discharge from the water treatment system.

10. A water treatment system according to claim 9, wherein the pH control system comprises a pH probe disposed in the waste stream downstream from the mixing tank.

11. A water treatment system according to claim 9, wherein the mixing tank is sized to store a liquid volume equal to about ten minutes of waste stream flow.

12. A method of treating a waste stream, comprising:
    (a) detecting a pH level of the waste stream;
    (b) storing a dry acid in an acid source and coupling the acid source with an acid discharge unit;
    (c) activating and deactivating the acid discharge unit according to the pH level of the waste stream; and
    (d) containing the acid discharge unit and at least part of the pH control system within a housing.

13. A method according to claim 12, wherein the acid discharge unit comprises an acid feeding mechanism at least partially disposed within the acid source, and wherein step (c) comprises feeding the dry acid into the waste stream when the pH level of the waste stream exceeds a predetermined level.

14. A method according to claim 12, wherein the acid discharge unit comprises an acid feeding mechanism including a mechanical pump, and wherein step (c) comprises:
    coupling the mechanical pump with a source of water;
    flowing the water to a mixing container for mixing the dry acid with the water to form a wet acidic solution; and
    feeding the wet acidic solution into the waste stream when the pH level of the waste stream exceeds a predetermined level.

15. A method according to claim 14, wherein the source of water is the waste stream.

16. A method according to claim 14, wherein the mixing container comprises an overflow outlet, and wherein step (c) is further practiced by piping the wet acidic solution directly into the waste stream via the overflow outlet.

17. A method according to claim 12, wherein the dry acid comprises a granular material that dissolves in water to form a weak acid solution.

18. A method according to claim 17, wherein the dry acid comprises sodium bisulfate.

19. A method according to claim 12, further comprising providing an area for acidic materials from the acid discharge unit to mix with the waste stream to become an aqueous solution with an acceptable pH level for discharge into the waste stream.

20. A pH level reduction system for concrete plant discharge, the system comprising:
    means for detecting a pH level of the plant discharge;
    an acid discharge unit communicating with the detecting means, the acid discharge unit including a source of acid and an acid feeding mechanism, wherein the detecting means comprises means for activating and deactivating the acid discharge unit according to the pH level of the plant discharge; and
    a housing containing the acid discharge unit and at least part of the detecting means.

21. A pH level reduction system for a waste stream, the system comprising:

a pH control system including a pH probe disposed in the waste stream that detects a pH level of the waste stream;

an acid discharge unit communicating with the pH control system, the acid discharge unit including a source of dry granular acid and one of a wet acid feeding mechanism and a dry acid feeding mechanism, wherein the pH control system further includes a controller communicating with the pH probe that activates and deactivates the acid discharge unit according to the pH level of the waste stream in a feedback control loop; and a weatherproof housing containing the acid discharge unit and the controller of the pH control system.

22. A system according to claim 21, wherein the dry granular acid comprises sodium bisulfate.

* * * * *